United States Patent
Griffin

(10) Patent No.: US 7,333,084 B2
(45) Date of Patent: Feb. 19, 2008

(54) THUMBWHEEL AND SWITCH FOR A MOBILE ELECTRONIC DEVICE AND METHODS THEREOF

(75) Inventor: Jason T. Griffin, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 687 days.

(21) Appl. No.: 10/790,202

(22) Filed: Mar. 2, 2004

(65) Prior Publication Data
US 2005/0195153 A1 Sep. 8, 2005

(51) Int. Cl.
*G09G 5/00* (2006.01)

(52) U.S. Cl. .............. 345/156; 345/168; 345/172; 345/169

(58) Field of Classification Search ........ 345/156–158, 345/168, 184, 102, 172, 164, 173, 179, 684, 345/27, 45, 163, 169; 710/303, 73; 708/105; 341/34, 22, 137; 711/169; 715/836; 714/749; 370/313; 362/85
See application file for complete search history.

(56) References Cited

U.S. PATENT DOCUMENTS

| | | | | |
|---|---|---|---|---|
| 3,950,700 | A * | 4/1976 | Weisbart | 324/161 |
| 5,209,560 | A * | 5/1993 | Taylor et al. | 362/85 |
| 5,317,542 | A * | 5/1994 | Konopelski | 367/12 |
| 5,479,408 | A * | 12/1995 | Will | 370/313 |
| 5,588,009 | A * | 12/1996 | Will | 714/749 |
| 5,769,527 | A * | 6/1998 | Taylor et al. | 362/85 |
| 5,792,165 | A * | 8/1998 | Klieman et al. | 606/170 |
| 5,825,353 | A | 10/1998 | Will | |
| 6,154,196 | A * | 11/2000 | Fleck et al. | 345/157 |
| 6,392,640 | B1 * | 5/2002 | Will | 345/184 |
| 6,489,950 | B1 * | 12/2002 | Griffin et al. | 345/168 |
| 6,549,191 | B2 * | 4/2003 | Leman | 345/168 |
| 6,580,421 | B1 * | 6/2003 | Leman | 345/168 |
| 6,940,488 | B1 * | 9/2005 | Siddiqui et al. | 345/163 |
| 2001/0024191 | A1 * | 9/2001 | Thomason | 345/163 |
| 2002/0063684 | A1 * | 5/2002 | Tran | 345/156 |
| 2003/0076292 | A1 * | 4/2003 | Griffin et al. | 345/156 |

(Continued)

FOREIGN PATENT DOCUMENTS

| | | |
|---|---|---|
| EP | 0 901 262 | 3/1999 |
| EP | 1 143 327 | 10/2001 |

OTHER PUBLICATIONS

European Communication pursuant to Article 96(2) EPC. Application No. 04004831.6-2224. Date: Jun. 12, 2006.

(Continued)

*Primary Examiner*—Prabodh Dharia
(74) *Attorney, Agent, or Firm*—Bereskin & Parr

(57) ABSTRACT

A mobile electronic device has a thumbwheel subassembly having measurable rotatable and depressible input movements, for example, rolling the thumbwheel up, rolling the thumbwheel down and pushing the thumbwheel inwards. Pushing the thumbwheel with a measurable component of downward force may result in inadvertent rolling of the thumbwheel down. Software or hardware may be used to cancel the inadvertent rolling of the thumbwheel down when the timing of the push and the roll are too close. The thumbwheel assembly may be oriented in the device so that the direction of depressible input movement of the thumbwheel is substantially aligned with the direction of the push by a user's thumb or finger that includes a measurable component of downward force.

4 Claims, 6 Drawing Sheets

U.S. PATENT DOCUMENTS

2004/0041792 A1* 3/2004 Criscione .................... 345/169
2004/0139162 A1* 7/2004 Adams et al. .............. 709/206
2005/0088413 A1* 4/2005 Brewer et al. ............. 345/163
2006/0197735 A1* 9/2006 Vuong et al. ............... 345/102
2007/0075974 A1* 4/2007 Griffin et al. ............... 345/168

OTHER PUBLICATIONS

European Communication under Rule 51(4) EPC. Application No. 04004831.6. Date: Mar. 12, 2007.

* cited by examiner

THUMBWHEEL AND SWITCH FOR A MOBILE ELECTRONIC DEVICE AND METHODS THEREOF

FIELD OF THE INVENTION

The present invention relates generally to mobile electronic devices having a thumbwheel for input.

BACKGROUND OF THE INVENTION

A thumbwheel subassembly includes a thumbwheel and a switch. The thumbwheel may have measurable rotation and depressible input movements, for example, rolling the thumbwheel up, rolling the thumbwheel down and pushing the thumbwheel inwards. A user may inadvertently roll the thumbwheel down while pushing the thumbwheel inwards.

SUMMARY OF THE INVENTION

In some embodiments of the invention, a method includes canceling detection of a rotation downward of a thumbwheel if detection of a depressible input movement of the thumbwheel occurs within a predetermined time threshold of detection of the rotation downward. The predetermined time threshold may be approximately 100 milliseconds. The method may be implemented by executing software instructions on a computing platform. The instructions may be stored on an article.

In some embodiments of the invention, a mobile electronic device includes a thumbwheel subassembly, a housing and a microprocessor inside the housing. The thumbwheel subassembly includes a thumbwheel and a switch. The housing has an opening through which the thumbwheel protrudes. The microprocessor is to compensate for inadvertent rolling of the thumbwheel down by a user while the user pushes the thumbwheel inwards. The microprocessor is to cancel detection of a rotation downward of the thumbwheel if detection of a depressible input movement of the thumbwheel occurs within a predetermined time threshold of the detection of the rotation downward.

In some embodiments, a mobile electronic device includes a flat display screen, a thumbwheel subassembly and a housing. The thumbwheel subassembly includes a thumbwheel and a switch. The housing has an opening through which the thumbwheel protrudes. The thumbwheel subassembly is oriented so that a direction of depressible input movement of the thumbwheel, when projected onto a plane substantially parallel to a plane of the flat display screen, is substantially aligned with a direction of a push by a user's thumb or finger that includes a measurable component of downward force. In some embodiments of the invention, the thumbwheel subassembly is oriented so that a direction of depressible input movement of the thumbwheel, when projected onto a plane substantially parallel to a plane of the flat display screen, is at an angle in a range of approximately 2 degrees to approximately 10 degrees with respect to a direction from a first point on a side of the housing having the opening to a second point directly across from the first point on an opposite side of the housing. The angle may be in a range of approximately 3 degrees to approximately 8 degrees, or approximately 4 degrees to approximately 6 degrees. The angle may be approximately 5 degrees.

BRIEF DESCRIPTION OF THE DRAWINGS

Embodiments of the invention may be understood by reference to the following detailed description when read with the accompanied drawings in which.

Figure 1:
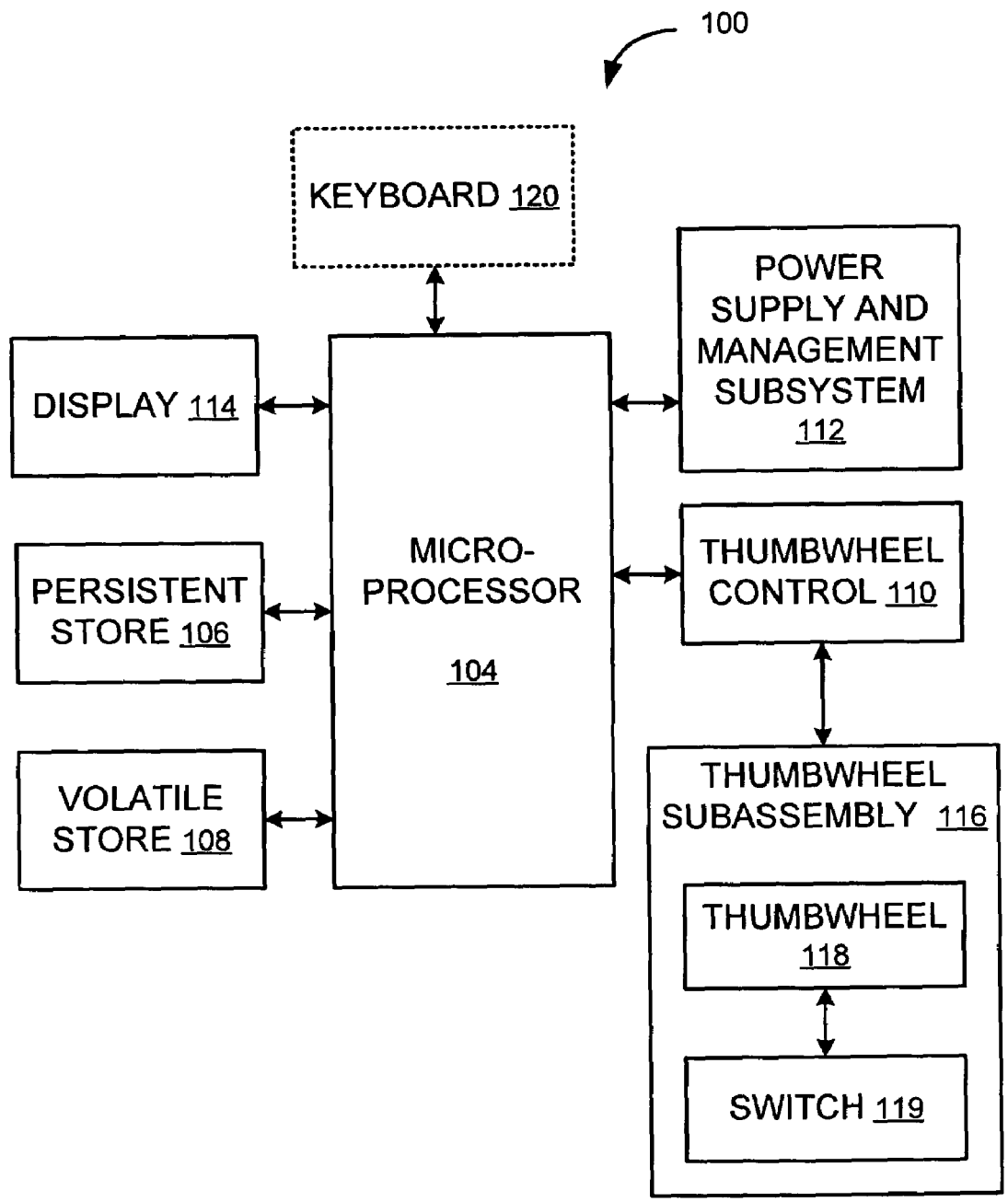
FIG. 1 is a block diagram of an exemplary mobile electronic device, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the embodiments of the invention. However it will be understood by those of ordinary skill in the art that embodiments of the invention may be practiced without these specific details. In other instances, well-known methods, procedures and components have not been described in detail so as not to obscure the invention.

FIG. 1 is a block diagram of an exemplary mobile electronic device 100, in accordance with some embodiments of the invention. Device 100 may be a personal data assistant (PDA), a personal information manager (PIM), a two-way pager, a cellphone, a handheld terminal, and the like. In some embodiments, device 100 may be a two-way communication device with data communication capabilities having the capability to communicate with other computer systems. In some embodiments, device 100 may also include the capability for voice communications.

Device 100 includes a microprocessor 104 that controls the overall operation of device 100, a persistent store 106, a volatile store 108, thumbwheel control logic circuitry 110, a power supply and management subsystem 112, a display screen 114, and a thumbwheel subassembly 116 coupled to thumbwheel control logic circuitry 110. Device 100 may optionally comprise a keyboard 120. Device 100 may comprise additional components (such as for example, a communications subsystem, a speaker, a microphone, etc.) that are not shown in FIG. 1 so as not to obscure the description of embodiments of the invention.

A non-exhaustive list of examples for display screen 114 includes a liquid crystal display (LCD) screen and a thin-film-transistor (TFT) LCD screen.

Operating system software used by microprocessor 104 is typically stored in persistent store 106, such as, for example, flash memory or read-only memory (ROM), programmable ROM (PROM), mask ROM, electrically programmable read-only memory (EPROM), electrically erasable and programmable read only memory (EEPROM), non-volatile random access memory (NVRAM), a magnetic or optical card, CD-ROM, and the like. Microprocessor 104, in addition to its operating system functions, enables execution of software applications on device 100. The operating system, specific device applications, or parts thereof, may be temporarily loaded into volatile store 108, such as for example, random access memory (RAM), static random access memory (SRAM), dynamic random access memory (DRAM), synchronous dynamic random access memory (SDRAM), RAMBUS dynamic random access memory (RDRAM), double data rate (DDR) memory, and the like.

Thumbwheel subassembly 116 may include a thumbwheel 118 and a switch 119. Thumbwheel subassembly 116 may have measurable rotation and depressible input movements, for example, rolling the thumbwheel up, rolling the thumbwheel down and pushing the thumbwheel inwards. A non-exhaustive list of examples for thumbwheel subassembly includes the Edge Drive Jog Encoder Type EVQWK manufactured by Panasonic and the Composite Control Switch Type SLLB from ALPS electronics.

Figures 2, 3:
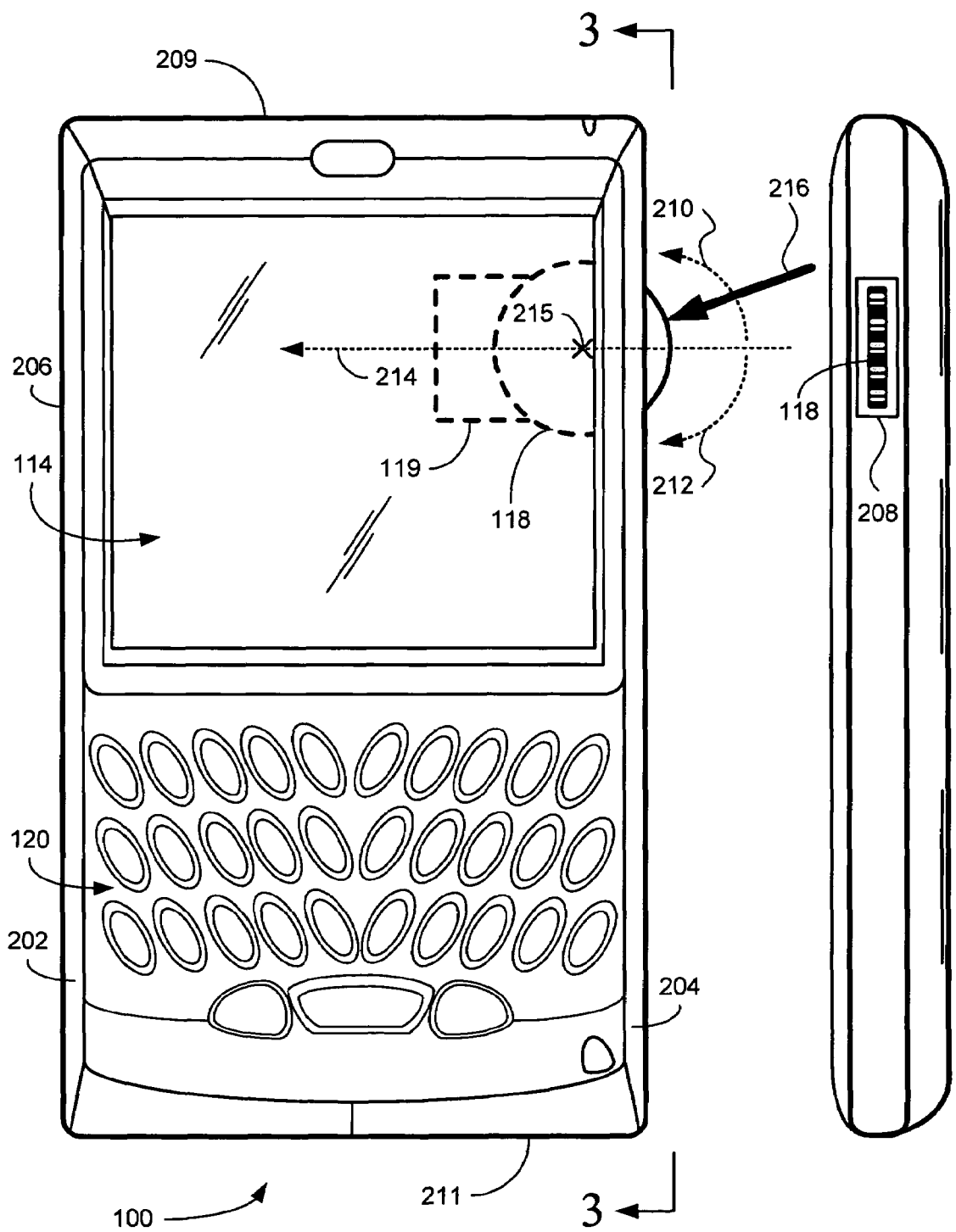
FIG. 2 is a front view of an exemplary mobile electronic device, in accordance with some embodiments of the invention.
FIG. 3 is a side view of the exemplary mobile electronic device of FIG. 2.

FIG. 2 is a front view of an exemplary mobile device 100, in accordance with some embodiments of the invention. In the example shown in FIG. 2, display screen 114 is flat. Device 100 is shown in FIG. 2 in the ordinary operating/viewing position in which it would be held by and between the user's hands at the left and right side edges 202 and 204 of device 100. FIG. 3 is a side view of device 100.

The housing 206 of device 100 has an opening 208 on the right side edge 204. Thumbwheel 118 protrudes through opening 208, which may be, for example, slot-shaped. Thumbwheel 118 may be in a "horizontal orientation", i.e. the circular opposite sides of thumbwheel 118 are in planes that are substantially parallel to the plane of a flat display screen 114. Alternatively, the thumbwheel may be inclined at an angle from the horizontal orientation, as shown in FIGS. 9-13 of U.S. Pat. No. 6,489,950.

When device 100 is held as shown in FIG. 2, a user may interface with thumbwheel 118 using a thumb or index finger, for example. Thumbwheel 118 has an axis of rotation 215. The direction of a rotation upward (towards a top edge 209 of device 100) is shown in FIG. 2 as a dotted curved arrow 210. The direction of a rotation downward (towards a bottom edge 211 of device 100) is shown in FIG. 2 as a dotted curved arrow 212.

The direction of depressible input movement of thumbwheel 118 is shown in FIG. 2 as a dotted arrow 214. (If thumbwheel 118 is inclined at an angle from the horizontal orientation, then dotted arrow 214 is the projection of the direction of depressible input movement of thumbwheel 118 onto a plane substantially parallel to the plane of flat display screen 114.)

Dotted arrow 214 is directed from a first point on right side edge 204 to a second point on left side edge 202 directly across from the first point.

Since pushing thumbwheel 118 is accomplished with the thumb or index finger, which pivots from below, the push may include a measurable component of downward force. For example, the push may be in the direction shown in FIG. 2 as arrow 216. In such cases, both rotation of thumbwheel downwards and the depressible input movement may be detected. Consequently, if the user intended to push thumbwheel 118 to select a particular item from a list, the next item down in the list may be selected instead inadvertently.

Figure 4:
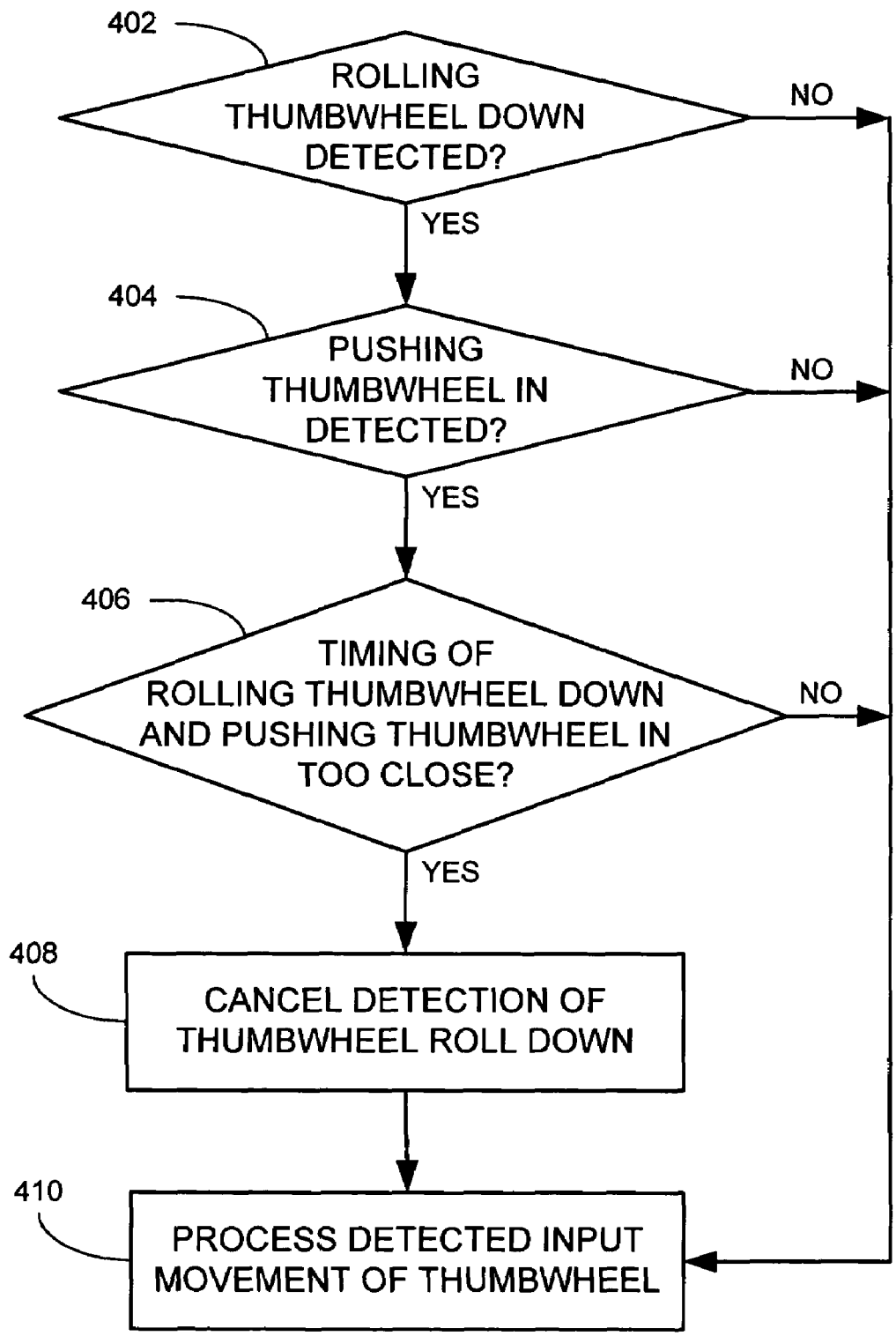
FIG. 4 is a flowchart illustration of an exemplary method to compensate for inadvertent rolling of the thumbwheel down while pushing the thumbwheel, in accordance with some embodiments of the invention.

FIG. 4 is a flowchart illustration of an exemplary method to compensate for inadvertent rolling of the thumbwheel down while pushing the thumbwheel, in accordance with some embodiments of the invention. The method is to be implemented by the software that handles detected input from thumbwheel subassembly 116. If rolling the thumbwheel down is detected (-402-), and subsequently pushing the thumbwheel in is detected (-404-), then it is checked whether the timing of the detection of rolling the thumbwheel down and the detection of pushing the thumbwheel in is too close (-406-). The time threshold may be, for example, approximately 100 milliseconds. If the timing is too close, then rolling the thumbwheel down is deemed inadvertent, and the detection of rolling the thumbwheel down is cancelled (-408-). The detected (and not cancelled) input movement of the thumbwheel is then processed (-410-).

It will be appreciated by persons of ordinary skill in the art that the exemplary method of FIG. 4, or any equivalent method, may be implemented in hardware rather than in software, or in a combination of hardware and software.

Figure 5:
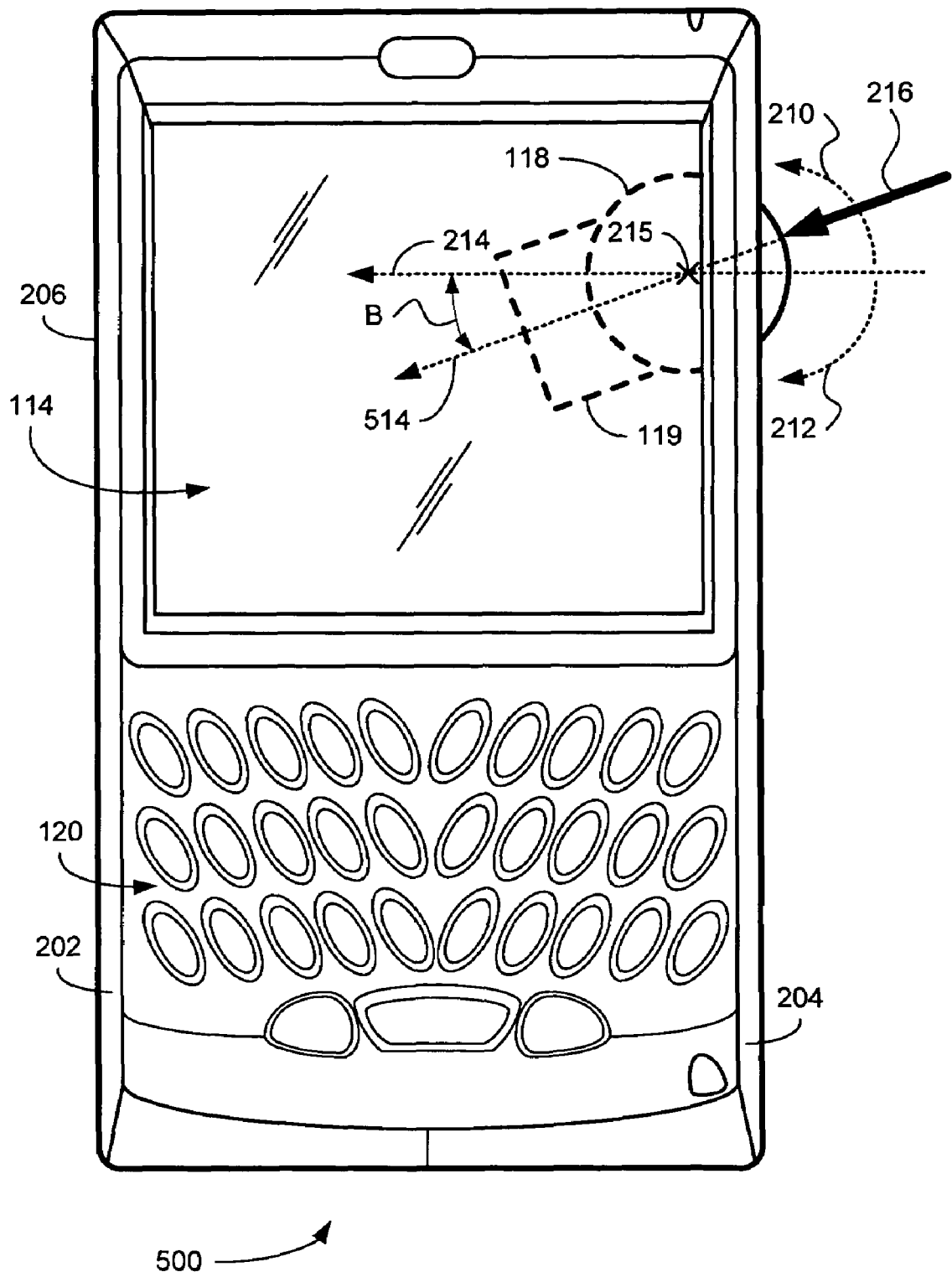
FIG. 5 is a front view of another exemplary mobile electronic device, in accordance with some embodiments of the invention.

FIG. 5 is a front view of a device 500, in accordance with some embodiments of the invention. Device 500 is similar to device 100 and therefore the same reference numerals are used for components and features that are the same or similar. In particular, dotted arrow 214, showing the direction of depressible input movement of thumbwheel 118 in device 100, and arrow 216, showing the direction of the push by a user's thumb or finger on thumbwheel 118, are repeated in FIG. 5. Thumbwheel subassembly 116 is oriented in device 500 so that the direction of depressible input movement of thumbwheel 118, shown as a dotted arrow 514, is at an angle B from dotted arrow 214. Angle B is such that the direction of depressible input movement of thumbwheel 118 (arrow 514) is substantially aligned with the direction of the push (arrow 216). Angle B may be in the range of approximately 2 degrees to approximately 10 degrees, or in the range of approximately 3 degrees to approximately 8 degrees, or in the range of approximately 4 degrees to approximately 6 degrees, or approximately 5 degrees.

Figures 6, 7:
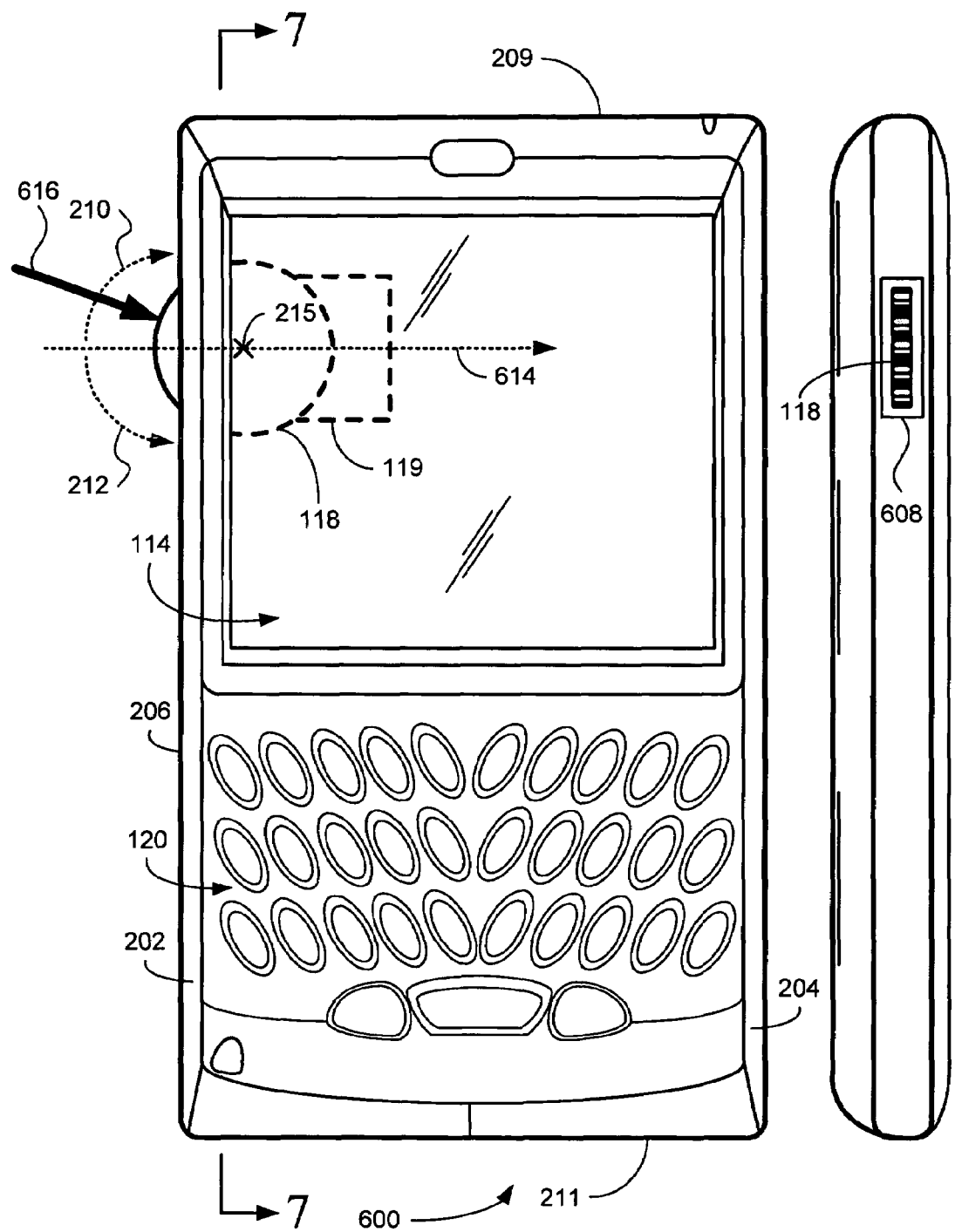
FIG. 6 is a front view of a left-handed version of the exemplary mobile electronic device of FIG. 2.
FIG. 7 is a side view of the exemplary mobile electronic device of FIG. 6.

FIG. 6 is a front view of a left-handed version of the exemplary mobile electronic device of FIG. 2, generally referenced 600. FIG. 7 is a side view of the exemplary mobile electronic device 600 of FIG. 6. In device 600, housing 206 may have an opening 608 on the left side through which thumbwheel 118 protrudes. The direction of depressible input movement of thumbwheel 118, or its projection onto a plane substantially parallel to the plane of flat display screen 114, is from left side edge 202 to right side edge 204. It is shown in FIG. 6 as a dotted arrow 614.

Since pushing thumbwheel 118 is accomplished with the thumb or index finger, which pivots from below, the push may include a measurable component of downward force. For example, the push may be in the direction shown in FIG. 6 as arrow 616. In such cases, both rotation of thumbwheel downwards and the depressible input movement may be detected. Consequently, if the user intended to push thumbwheel 118 to select a particular item from a list, the next item down in the list may be selected instead inadvertently.

The method described hereinabove with respect to FIG. 4 is equally applicable to device 100 and to device 600.

Figure 8:
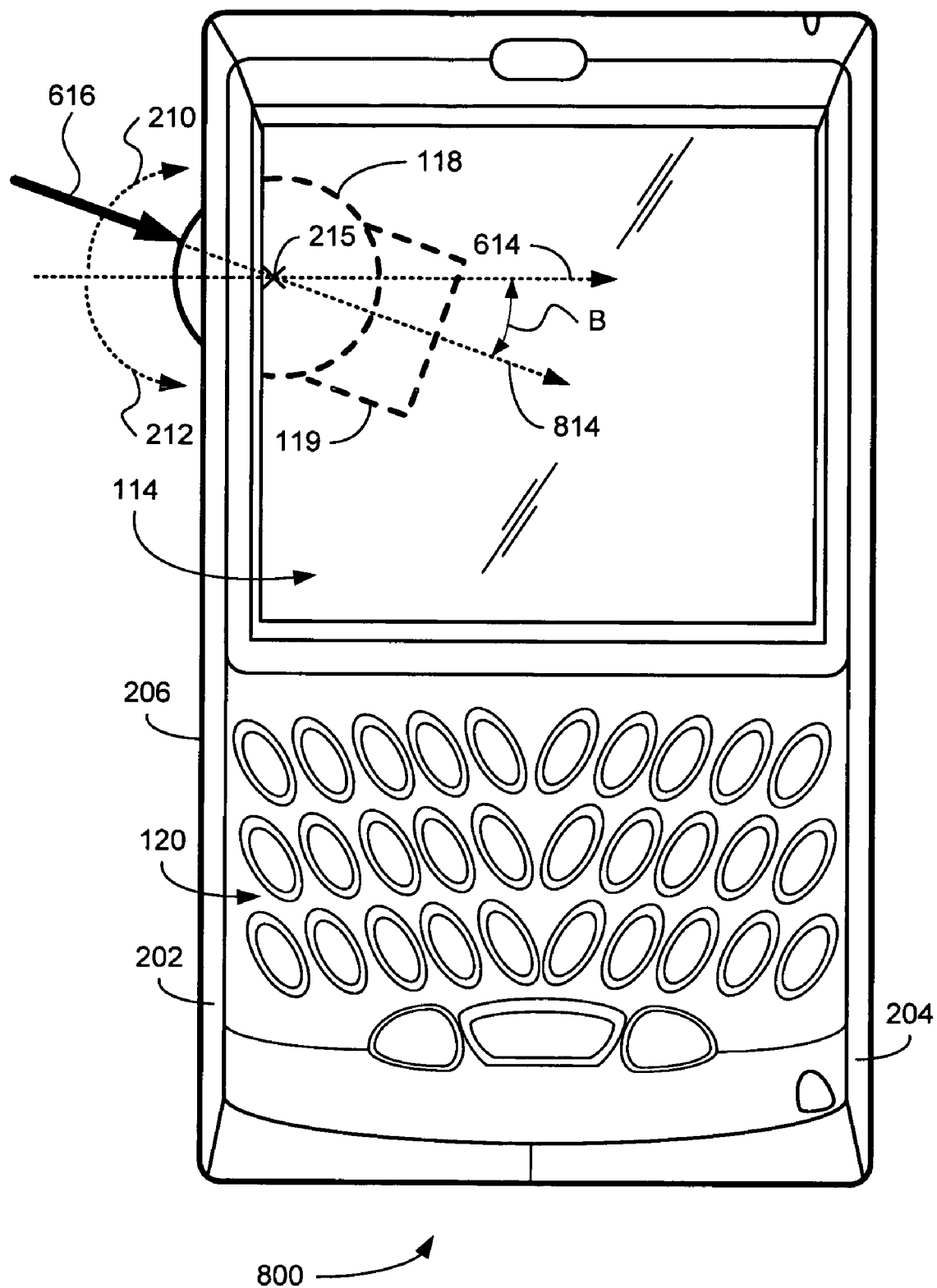
FIG. 8 is a front view of a left-handed version of the exemplary mobile electronic device of FIG. 5.

FIG. 8 is a front view of a left-handed version of the exemplary mobile electronic device of FIG. 5, generally referenced 800. Dotted arrow 614, showing the direction of depressible input movement of thumbwheel 118 in device 600, and arrow 616, showing the direction of the push by a user's thumb or finger on thumbwheel 118, are repeated in FIG. 8. Thumbwheel subassembly 116 is oriented in device 800 so that the direction of depressible input movement of thumbwheel 118, shown as a dotted arrow 814, is at an angle B from dotted arrow 614. Angle B is such that the direction of depressible input movement of thumbwheel 118 (arrow 814) is substantially aligned with the direction of the push (arrow 616). Angle B may be in the range of approximately 2 degrees to approximately 10 degrees, or in the range of approximately 3 degrees to approximately 8 degrees, or in the range of approximately 4 degrees to approximately 6 degrees, or approximately 5 degrees.

While certain features of embodiments of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A mobile electronic device comprising:
    a thumbwheel subassembly including a thumbwheel and a switch;
    a housing having an opening through which said thumbwheel protrudes;
    and a microprocessor inside said housing to compensate for inadvertent rolling of said thumbwheel down by a user while said user pushes said thumbwheel inwards by cancelling detection of a rotation downward of a thumbwheel if detection of a depressible input movement of said thumbwheel occurs within a predetermined time threshold of detection of said rotation downward; and
    a flat display screen;
    wherein said thumbwheel subassembly is oriented so that a direction of depressible input movement of said thumbwheel, when projected onto a plane substantially parallel to a plane of said flat display screen, is at an angle in a range of approximately 2 degrees to approximately 10 degrees with respect to a direction from a first point on a side of said housing having said opening to a second point directly across from said first point on an opposite side of said housing.

2. The mobile electronic device of claim 1, wherein said angle is in a range of approximately 3 degrees to approximately 8 degrees.

3. The mobile electronic device of claim 1, wherein said angle is in a range of approximately 4 degrees to approximately 6 degrees.

4. The mobile electronic device of claim 1, wherein said angle is approximately 5 degrees.

* * * * *